Feb. 24, 1942.  J. L. BRANNON ET AL  2,273,926
METHOD OF FORMING METAL SHELLS AND ARBOR FOR THE SAME
Filed Dec. 20, 1938    2 Sheets-Sheet 2

INVENTORS
James L. Brannon & Stephen A. Mraz
BY
Jp. N. Nielsen
ATTORNEY

Patented Feb. 24, 1942

2,273,926

UNITED STATES PATENT OFFICE 2,273,926

METHOD OF FORMING METAL SHELLS AND ARBOR FOR THE SAME

James L. Brannon, Plainfield, and Stephen A. Mraz, Perth Amboy, N. J., assignors to Bakelite Corporation, a corporation of New Jersey Application December 20, 1938, Serial No. 246,778

8 Claims. (Cl. 22—136)

This invention relates to arbors or steel masters and the method of forming slush or lead articles therefrom.

The invention finds a more particular application to the preparation of molds into which liquid resins are poured and then hardened. The molds are made of lead or type metal and usually formed by dipping a steel master mold or arbor into the metal while the latter is in a molten state whereupon the molten metal freezes or congeals thereon; the resulting layer of frozen metal is then stripped from the master mold, as by jarring the frozen metal mold loose from the steel master mold or arbor. These casting molds are frequently called slush molds.

As heretofore made, each unit slush mold has comprised one or more individual molds and has an upwardly flared over-flow chamber to facilitate the pouring of resin into the individual molds. These over-flow chambers, however, vary in height and size and hence can not be arranged or grouped in regular and uniformly spaced rows; moreover, they are relatively thin and become crimped with handling. This has caused much inconvenience in casting the resin by requiring each unit mold to be poured separately and has wasted resin in the form of a layer left in the over-flow chamber and sometimes spilled over the crimped edges. Usually, the resin has been first poured into a ladle and then from the ladle into the over-flow chamber of each unit slush or casting mold. This not only has necessitated considerable manual work but also has occasioned considerable delay during which the liquid resin has cooled and thickened, and the pouring operation has thus been rendered increasingly difficult. Furthermore, as the resin cooled it has increased in viscosity and any bubbles in the individual molds have thereafter been removed with difficulty, if at all. Finally, after curing each cast article has had to be knocked out of its individual mold separately, because the irregularly shaped over-flow chambers have resulted in unit molds not easily centered or positioned in an arbor press fitted with a composite or gang knock-out die.

The present invention overcomes these and other difficulties which have heretofore handicapped the cast resin industry by providing an improved arbor for making unit slush molds which are uniform in size and thus can be readily stacked or grouped and handled in automatic or semi-automatic machinery; all the resin articles cast and hardened in such a unit mold can be knocked out by one stroke of a punch press provided with gang knock-out dies.

The principle upon which this invention is based is the failure of molten low melting point metals to freeze on sharp edges of steel arbors which are dipped therein. This is attributable to the rapidity with which such sharp edges become heated to the temperature of the molten metal; edges of this character are bounded by surfaces that are at an acute angle, i. e. materially less than 90 degress with each other or are relatively close together to give a thin structure of the nature of a wedge or strip.

Briefly, the invention provides an arbor having a backing plate provided on its edge with a wedge shaped skirt having a sharp knife or severing edge along its bottom; this skirt is adapted to hang down a short distance around the fingers of the arbor. Venting holes or slots are provided in the backing plate or, preferably, extend laterally through the skirt for discharging gases entrapped thereunder; this allows the molten lead to run up under the skirt.

The foregoing, as well as other and further advantages and objects will be readily understood by referring to the following description and more particularly to the drawings which illustrate a specific embodiment of this invention and wherein.

Figure 1:
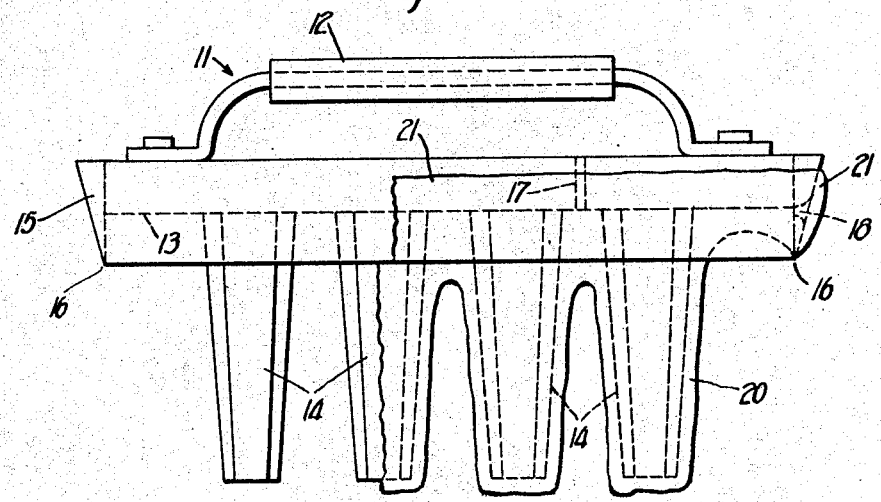
Figure 1 is a lateral view of an arbor, showing a portion of a lead shell or unit casting mold formed on the right hand portion of the arbor, the left portion of the lead shell being cut away in order to show the construction of the arbor.
Figure 2:
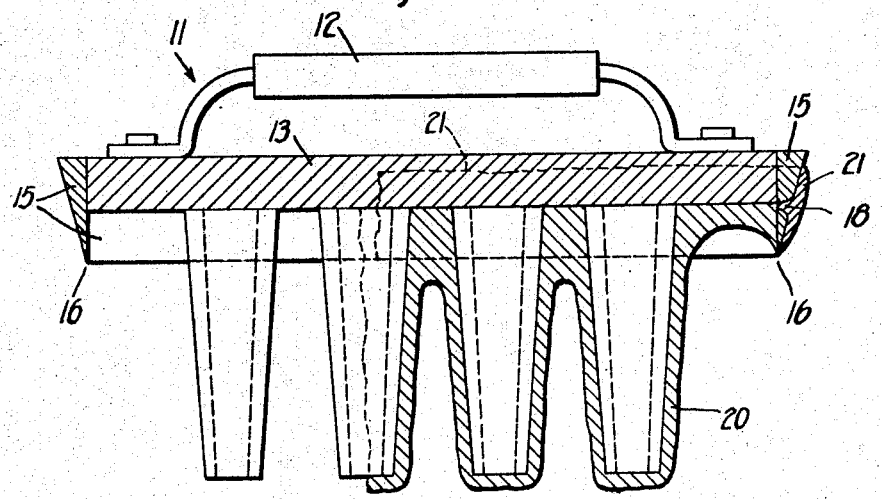
Figure 2 is a vertical sectonal view of the arbor and lead shell mold showing the skirt and venting holes.

Referring now in more detail to the drawings, an arbor Fig. 1, comprises a handle 11, an insulating sheath 12, and a backing plate 13 having mounted on its lower surface a number of fingers 14 and having on its sides a wedge shaped skirt portion 15 with a knife edge 16. Venting holes 17 in the backing plate, or preferably as at 18 in the skirt, are provided for discharging gases entrapped under the skirt 15 thus enabling the molten lead to run up under the skirt.

When dipped into molten lead, a lead shell or casting form 20 freezes and hardens conformably over the fingers 14 and heavy portions of the arbor; relatively little if any lead freezes on the sharp edge 16. The layer of metal 21 which forms on the outside of skirt 15 falls off upon withdrawal of the arbor from the molten bath or drops off when the steel arbor is freed from its lead shell during the arbor stripping or jarring step. This outside strip of metal 21 is usually the first part to be jarred loose and is easily removed because the molten lead does not freeze on or across the sharp knife edge 16 and hence no support is left for strip 21 once it is jarred loose from skirt portion 15. Further jarring of the lead mold and arbor assembly serves to separate the lead mold from the arbor, leaving a lead mold having a flat top 22 and straight parallel sides 23 extending a short distance down from the top 22; lead molds formed in this way are all uniform in size and shape and hence can be stacked or grouped together like paving blocks, as is clearly shown in Fig. 3, to form a composite mold having any desired number of mold cavities.

A number of molds can then be secured in position by border pieces 30, and a binder 31 can be affixed around the edges of the outermost lead molds to form a retaining wall. A supply of resin 40 can then be emptied directly from the still over the upper surface 22 of the molds and flowed into the individual mold cavities with the aid of scraper 41.

Venting holes 18, Fig. 1, are preferred to those shown at 17, since the lead lugs left by the latter must be cut off before the molds can be stacked; but with the vents 18 which pass through the skirts 15, the lugs are cut off simultaneously with the stripping of the lead shell from the arbor.

Figure 3:
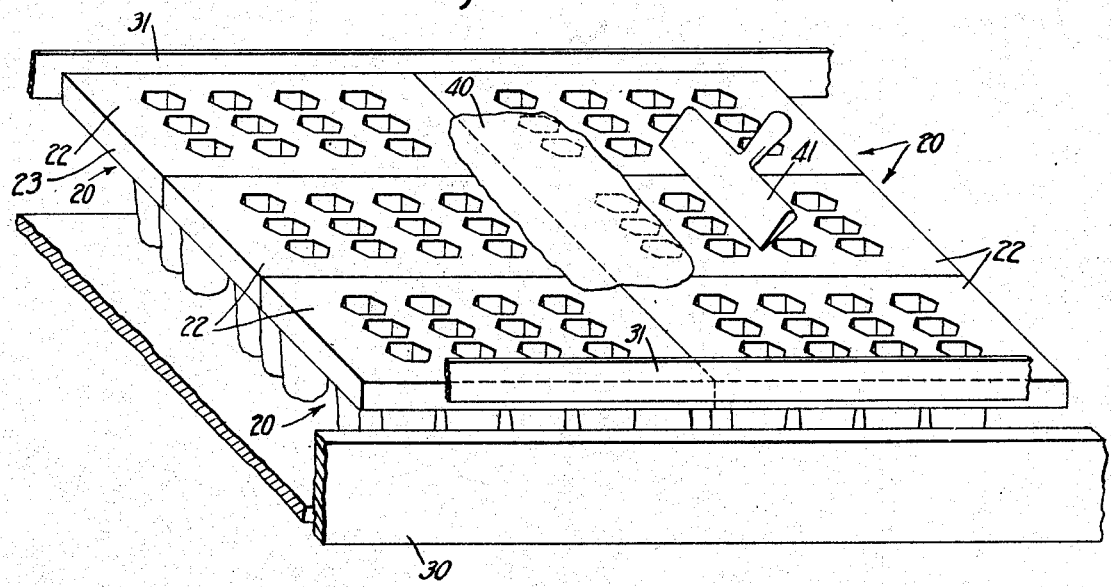
Figure 3 is a perspective view of a number of lead shell or unit casting molds stacked or grouped for the resin pouring or casting step.
Figure 4:
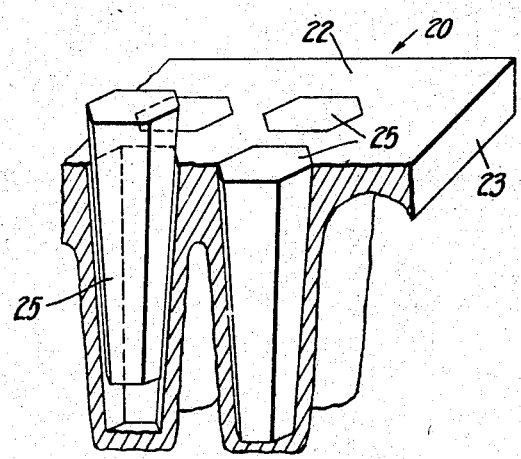
Figure 4 is a perspective view partially in vertical section of the unit casting mold shown in Fig. 1, after the arbor has been withdrawn and resin articles have been cast and hardened in the individual mold cavities of the lead shell.

After the lead shell or casting forms 20, Fig. 4, are filled with the viscous resin they are stoved and heated at such a temperature and for such a period of time that the resin sets or curves to a permanently hardened state; then the hardened cast articles such as 25, Fig. 3, are removed by knocking against the bottom of the lead molds with a hammer, air gun, punch press or the like.

Figure 5:
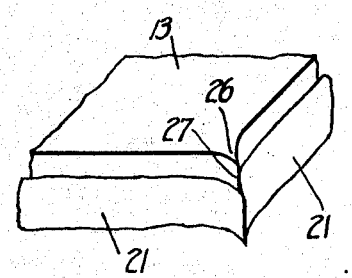
Figure 5 is a corner portion of a modified arbor.

The modification of the arbor shown in Fig. 5 includes a built up corner 26 which forms a sharp edge 27 whereon little if any lead freezes. This results in a splitting of the strip 21 and thus facilitates the removal of the strip, particularly where long mold cavities are made.

This type of mold effects a considerable saving in casting time, as the resin can be discharged on the surface 22 directly from the still and while it is hot and thus has a very low viscosity; this helps considerably in eliminating air bubbles. Also, with the elimination of the individual over-flow chambers and with the introduction of the scraping step, excess resin heretofore left in the over-flow chambers is removed and used in the cast and hardened articles. Thus, the resin waste is largely eliminated and with large composite molds, the casting process becomes semi-automatic. Furthermore, because of the uniformity in size and contour of the contiguous sides of the unit molds very little or no resin runs down between the contiguous sides 23 of the molds. This uniformity of size also makes possible the use of automatic machinery for knocking out the contents of an entire unit mold in one operation and thereby eliminates the tedious and time consuming process heretofore used wherein each article has been knocked out individually by hand or with the aid of a pneumatic hammer.

What is claimed is:

1. Arbor for immersion into molten material for the freezing thereon of a shell of the material comprising in combination a dipping member, a plate extending transversely of the direction of dipping and from which the member projects, means associated therewith for delimiting the surface upon which a continuous shell freezes, said means comprising a skirt bounded by surfaces relatively close together in acute angular relationship to each other extending from the plate in the same direction and about the member, and a vent for releasing gases entrapped between the skirt and the member.

2. Arbor for immersion into molten material for the freezing thereon of a shell of the material comprising in combination a dipping member, a plate extending transversely of the direction of dipping and from which the member projects, and means associated therewith for delimiting the surface upon which a continuous shell freezes, said means comprising a skirt bounded by surfaces relatively close together in an acute angular relationship to each other extending from the plate in the same direction and about the member.

3. Arbor for immersion into molten material for the freezing thereon of a shell of the material comprising in combination a dipping member, a plate extending transversely of the direction of dipping and from which the member projects, and means associated therewith for delimiting the surface upon which a continuous shell freezes said means including a skirt bounded by surfaces relatively close together in an acute angular relationship to each other extending from the plate in the same direction and about the member and providing an interior wall for defining a bounding surface of a shell formed on the arbor.

4. Arbor for immersion into molten material for the freezing thereon of a shell of the material comprising in combination a dipping member, and a plate extending transversely of the direction of dipping and from which the member projects, said plate having a peripheral skirt bounded by surfaces relatively close together in an acute angular relationship to each other for delimiting the surface upon which a continuous shell freezes.

5. Arbor for immersion into molten material for the freezing thereon of a shell of the material comprising a dipping member having a peripheral strip bounded by surfaces relatively close together in an acute angular relationship to each other associated therewith for delimiting the surface upon which a continuous shell freezes.

6. In a method of forming a shell by the dipping of an arbor in a molten material and the freezing of the material thereon, the steps which comprise delimiting the surface of the arbor covered by the shell, and causing separation of an excess formed in extension of the shell on the arbor by preventing freezing along the bounding edge of the delimited surface.

7. In a method of forming a shell by the dipping of an arbor in a molten material and the freezing of the material thereon, the steps which comprise delimiting the surface of the arbor covered by the shell by a surface transverse to the direction of dipping, and causing separation of an excess formed in extension of the shell on the arbor by preventing freezing along the bounding edge of the transverse surface.

8. In a method of forming a shell by the freezing of molten metal on an arbor, the steps which comprise dipping a relatively cold arbor in the molten metal to freeze a shell of the metal thereon, and delimiting the extent of the shell so formed by a heating localized and sufficient to prevent freezing at the boundary.

JAMES L. BRANNON.
STEPHEN A. MRAZ.